US011444931B1

(12) United States Patent
Quevedo

(10) Patent No.: US 11,444,931 B1
(45) Date of Patent: Sep. 13, 2022

(54) MANAGING NAME SERVER DATA

(71) Applicant: F5 Networks, Inc., Seattle, WA (US)

(72) Inventor: Mark Ernest Quevedo, Issaquah, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/910,345

(22) Filed: Jun. 24, 2020

(51) Int. Cl.
*H04L 9/40* (2022.01)
*H04L 41/50* (2022.01)
*H04L 61/4511* (2022.01)

(52) U.S. Cl.
CPC .............. *H04L 63/08* (2013.01); *H04L 41/50* (2013.01); *H04L 61/4511* (2022.05); *H04L 63/0428* (2013.01)

(58) Field of Classification Search
CPC . H04L 63/08; H04L 63/0428; H04L 61/1511; H04L 41/50
See application file for complete search history.

(56) References Cited

U.S. PATENT DOCUMENTS

| 7,343,397 | B2 | 3/2008 | Kochanski |
| 8,583,801 | B2 | 11/2013 | Fleischman et al. |
| 8,671,221 | B2 | 3/2014 | Shribman et al. |
| 8,676,989 | B2 | 3/2014 | Truehaft et al. |
| 8,972,580 | B2 | 3/2015 | Fleischman et al. |
| 10,033,692 | B1 * | 7/2018 | Vavrusa .............. H04L 61/6013 |
| 2002/0010798 | A1 * | 1/2002 | Ben-Shaul ............ G06F 16/958 707/E17.116 |
| 2003/0182423 | A1 * | 9/2003 | Shafir ................. H04L 63/0428 709/225 |
| 2009/0070453 | A1 * | 3/2009 | Douglis .............. H04L 61/6009 709/223 |
| 2009/0094382 | A1 * | 4/2009 | Tsimelzon ................ G06F 9/54 709/246 |
| 2009/0210526 | A1 * | 8/2009 | Howell ............. H04L 29/12811 709/224 |
| 2010/0011420 | A1 * | 1/2010 | Drako ..................... H04L 51/12 726/5 |
| 2012/0017090 | A1 * | 1/2012 | Gould ..................... H04L 63/12 713/176 |
| 2012/0203861 | A1 * | 8/2012 | Flack ..................... G06Q 10/10 709/217 |
| 2012/0278626 | A1 * | 11/2012 | Smith ................... H04L 63/123 713/168 |
| 2013/0318602 | A1 * | 11/2013 | Devarapalli ........ H04L 67/1002 726/22 |
| 2014/0244725 | A1 * | 8/2014 | Fleischman ............. H04L 69/40 709/203 |
| 2014/0317177 | A1 * | 10/2014 | Day .................... H04L 67/2842 709/203 |

(Continued)

*Primary Examiner* — Jimmy H Tran

(74) *Attorney, Agent, or Firm* — Troutman Pepper Hamilton Sanders LLP (Rochester)

(57) ABSTRACT

Technology related to managing name server data is disclosed. In one example, a method includes receiving a first request for data from a name server service. In response to determining that a locally stored version of the requested data is unreliable, a second request can be sent to a second service. The second service can be different from the name server service. A response from the second service can be authenticated. In response to authenticating the response from the second service, the locally stored version of the requested data can be returned to a client.

20 Claims, 8 Drawing Sheets

(56) References Cited

U.S. PATENT DOCUMENTS

| | | | | |
|---|---|---|---|---|
| 2015/0163245 | A1* | 6/2015 | Kondamuru | H04L 29/12066 |
| | | | | 726/6 |
| 2016/0028847 | A1* | 1/2016 | Bradshaw | H04L 67/2842 |
| | | | | 709/213 |
| 2016/0308821 | A1* | 10/2016 | Siba | H04L 67/28 |
| 2017/0019371 | A1* | 1/2017 | Osterweil | H04L 61/1511 |
| 2017/0324724 | A1* | 11/2017 | Smith | H04L 63/123 |
| 2018/0375713 | A1* | 12/2018 | Huque | H04L 41/0654 |
| 2019/0058775 | A1* | 2/2019 | Flack | H04L 67/2842 |
| 2019/0109772 | A1* | 4/2019 | Lipstone | H04L 67/1078 |
| 2019/0199678 | A1* | 6/2019 | Townsend | H04L 61/20 |
| 2019/0230194 | A1* | 7/2019 | Stevens | H04L 67/42 |
| 2019/0342260 | A1* | 11/2019 | Treuhaft | H04L 61/1511 |
| 2020/0127964 | A1* | 4/2020 | Stahura | H04L 61/1511 |
| 2020/0162417 | A1* | 5/2020 | Teodosiu | H04L 63/0815 |
| 2020/0314055 | A1* | 10/2020 | Blinn | H04L 61/1552 |
| 2020/0366711 | A1* | 11/2020 | Phillips | H04L 61/1511 |
| 2020/0412791 | A1* | 12/2020 | Gero | H04L 67/2833 |
| 2021/0092595 | A1* | 3/2021 | Ramachandran | H04L 61/1511 |
| 2021/0200830 | A1* | 7/2021 | Shribman | H04L 67/1021 |
| 2021/0266185 | A1* | 8/2021 | Konda | H04L 9/3268 |
| 2022/0078044 | A1* | 3/2022 | Shribman | H04L 63/164 |
| 2022/0103525 | A1* | 3/2022 | Shribman | H04L 63/029 |
| 2022/0124168 | A1* | 4/2022 | Shribman | H04L 67/02 |

* cited by examiner

MANAGING NAME SERVER DATA

FIELD

This technology generally relates to network traffic management, and more specifically to managing name server data, such as Domain Name System (DNS) records.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: receiving a first request for data from a name server service. The method also includes determining a locally stored version of the requested data is unreliable. The method also includes, in response to determining the locally stored version of the requested data is unreliable, sending a second request to a second service different from the name server service. The method also includes authenticating a response from the second service. The method also includes, in response to authenticating the response from the second service, returning the locally stored version of the requested data to a client.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for managing name server data, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
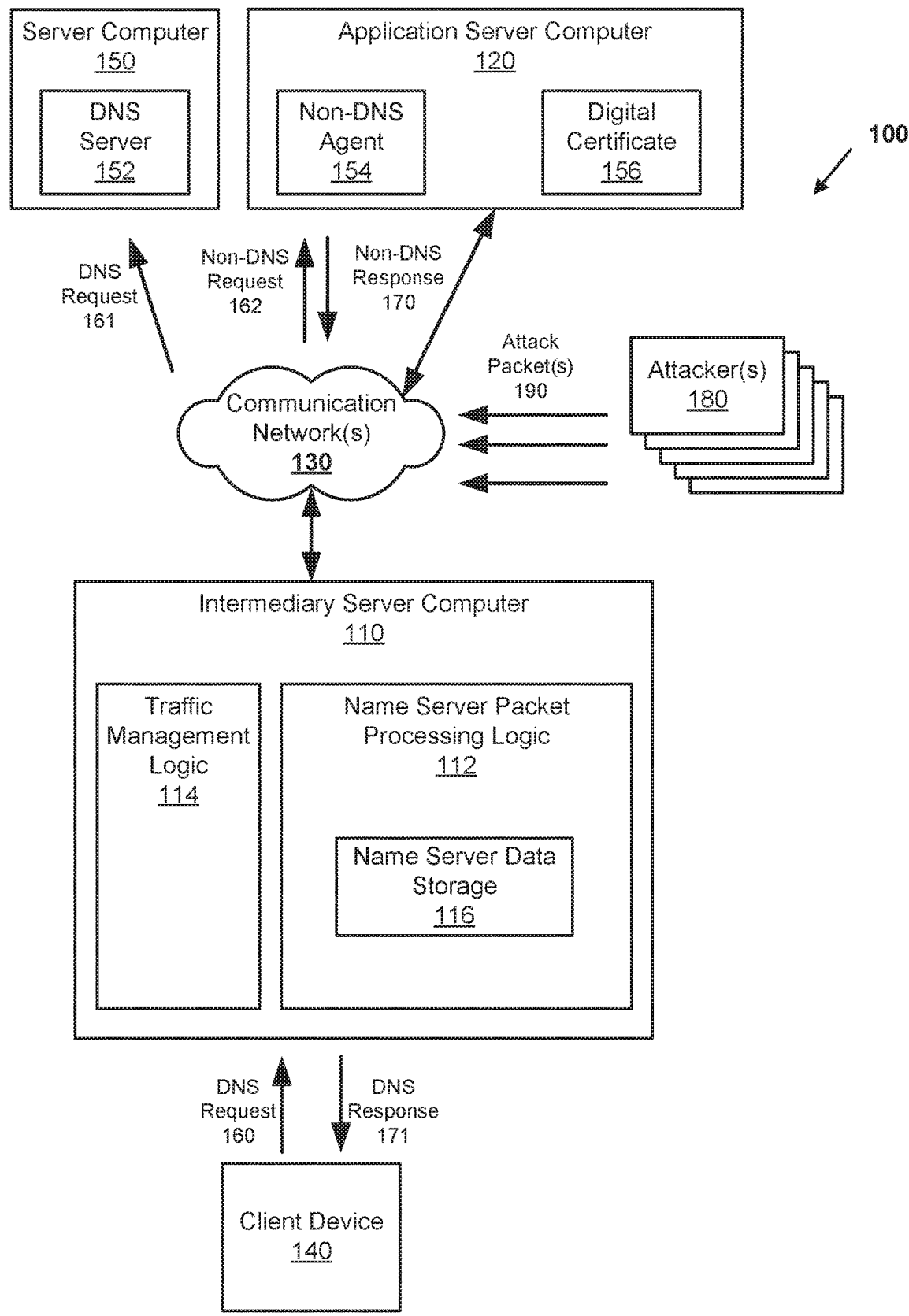
FIG. 1 is a block diagram of an example client-server architecture including an intermediary server computer including packet processing logic, such as for servicing name server requests.

An intermediary server computer can perform various proxy and other services by processing packets that transit the intermediary server computer. For example, the intermediary server computer can perform load balancing, rate monitoring, caching, encryption/decryption, session management (including key generation), address translation, denial-of-service (DoS) protection, and/or access control, for example. An intermediary server computer can act as a proxy for an application server. A proxy is an agent that is situated in a path of communication between a client and a server (e.g., an application server) that can intercept communications (e.g., network packets, frames, datagrams, and messages) between the client and the server. Load balancing can include distributing or disaggregating workloads from many clients across different server computers. Additionally, functions performed by the application server computer and/or the client device can be offloaded to the intermediary server computer.

Name server protocols, such as the Domain Name System (DNS) protocol, can be used to facilitate a name server service. Generally, a network service is a component of a distributed application that is accessible over a network and is accessed using an application layer (L7) protocol. For example, a network service can be implemented in a client-server or peer-to-peer architecture and can provide computational and/or storage functionality in response to requests to the service. A name server service can be used to manage a namespace and to map names within the namespace to associated information. For example, a DNS service can be used to map a website name (e.g. website.example.com) to a network address of a website server (e.g., 192.0.2.20) that hosts the website. For example, a DNS client can send a DNS request, requesting an address of the website, to a DNS server. The DNS server can respond to the DNS client by returning both the name of the website and the address of the website. An intermediary server can be interposed between the DNS client and the DNS server so that the client requests are intercepted by the intermediary server. The intermediary server computer can potentially speed up DNS by caching DNS responses from the DNS server and using the cached values to respond directly to the DNS clients rather than forwarding DNS requests to the DNS server. Specifically, the caching of the DNS information can be performed by a DNS recursive resolver of the intermediary server computer, where the DNS recursive resolver can issue DNS service requests (DNS queries) on behalf of DNS clients and cache the responses.

The DNS protocol is architected to execute on a dynamic hierarchical computing system. For example, a DNS recursive resolver can initiate a recursive query on behalf of a client issuing a DNS request. The recursive query can be sent to a first DNS server which can respond to query using cached and/or authoritative information stored at the first DNS server, and/or the recursive query can be forwarded to one or more other DNS servers to retrieve the information. An authoritative DNS server is a server that holds the primary authoritative record for a given DNS record. For example, an administrator of a website can designate a DNS server to store the primary record that maps the website name to a website address. The authoritative DNS server and/or the website address can change over time due to a variety of factors, such as hardware failures, software errors, power failures, network outages, the addition of hardware capacity, and so forth. To account for the possibility of changes to the DNS records, the record can include a lifetime or expiration time. For example, the record can include a time-to-live (TTL) field that indicates a time in seconds that a cached version of the record remains valid. When the cached version of the record expires, after the specified time in the TTL field has elapsed, the record is unreliable, and a new query for the record can be issued directly or through a chain of DNS servers to the authoritative DNS server so that the record can be refreshed.

An attacker can attempt to disrupt DNS as part of a denial of service (DoS) attack to prevent clients from communicating with an application server. For example, the attacker can block the client from receiving valid DNS responses and/or by corrupting stored DNS information that provides an address for the application server. Two types of DNS response-based attacks are DNS reflection/amplification attacks and DNS cache poisoning attacks. A DNS reflection attack can be launched against a DNS recursive resolver when an attacker sends DNS requests to internet authoritative DNS servers with the victim's source network address (e.g., Internet Protocol (IP) address) spoofed, causing the (possibly much larger) DNS responses to be sent to the victim where they ultimately must be inspected and dropped. A DNS cache-poisoning attack is similar, but may be direct instead of reflected from the DNS server. In the cache-poisoning attack, the attacker crafts illegitimate DNS responses and sends them to a victim, randomizing port numbers and query ID numbers in an attempt to trick a DNS resolver into accepting a forged response (and caching it for a forged time-to-live (TTL)) before the true response from an actual query made by the resolver arrives from the authoritative DNS server originally contacted. Accordingly, DNS servers can be inaccessible and/or DNS records can be corrupted.

When a client cannot access valid DNS data, the client can be blocked from accessing the application server whose address is specified by the DNS data. Specifically, the DNS protocol specifies that expired DNS records are not valid and that an error message is to be returned when a valid DNS record cannot be obtained from a DNS server. Accordingly, the DNS data cannot be used to generate a valid mapping of the server name to its corresponding network address. In one solution, a DNS server can return invalid (e.g., expired) data in a DNS request using the last known valid data from the DNS record. However, the solution both violates the DNS protocol and creates a risk that the application server is not operational at the network address generated from the invalid DNS record.

As described herein, a server identified in a DNS record can be validated using a different, non-DNS, service executing on a server computer associated with the DNS record. For example, when a DNS record is determined to be unreliable, another service can be used to validate that the server computer is operational. An unreliable version of a name server record is a record that has not been updated using a protocol of the name server service (e.g., DNS) and/or there is another suspected issue with the record (e.g., when the record may be forged or corrupt). A typical reason for the record to be unreliable is that the record is expired (e.g., the record has been stored for longer than its specified TTL). Using a different non-DNS service to validate the DNS record can have a basis from the practice that administrators may set the expiration time of resource records to be relatively shorter than a typical time between network address changes, and relatively shorter than potential durations of authoritative resolution failure. When it can be ascertained that a named service is available at a certain address without reference to authoritative name resolution, DNS replies can be synthesized to steer clients to that service. Compared to merely returning expired DNS records from a DNS cache, returning synthesized DNS records based on independently ascertained service availability can potentially give clients more accurate information and produce better user experiences.

As a specific example, a name server resource record (RR) can be stored in a data structure of a local nameserver data store (e.g., a nameserver cache or a DNS cache) beyond the expiration time of the RR. When a name server query is received but stale data is stored in the local data store, and the stale data cannot be refreshed because authoritative nameservers upstream are unresponsive or unreachable (perhaps because they are under a DoS attack), a second service can be used to validate the RR. For example, the expired data can be tested by attempting a Transport Layer Service (TLS) connection to the server at the network address stored in the RR. The TLS connection request can be sent to a specific port (e.g., port 443 (Hypertext Transfer Protocol Secure (HTTPS)) or port 25 (Simple Mail Transfer Protocol (SMTP))) and the name from the RR can be used in a Server Name Indication (SNI) of the connection request. For each server that is cryptographically authenticated under the queried name, the expiration time (e.g., the TTL) of the corresponding RR in the local data store can be extended for a time period and a suitable synthesized response (e.g., a non-error response) can be returned to the client. While a TLS handshake can be more costly than a typical DNS query, the cost of the TLS handshake can potentially be amortized over many transactions with the clients. Limits can be set for how often or how long to extend the use of a stale RR, and to control which RRs are eligible for such treatment. When authoritative resolution becomes available (again) the local nameserver data store can be refreshed with data from the name service.

Using a secondary service can also be used to potentially detect compromised nameservers and their associated RRs. For example, when it is suspected that a particular nameserver record is steering traffic to an improper address, the secondary service (e.g., TLS) can be used to discover whether the server at that address has valid credentials (e.g., a digital certificate) for the target name. If the server does not have valid credentials, the suspected RRs can be deprecated and a system administrator can be notified or security measures can be automatically implemented, such as blocking network traffic from the server. Additionally, copies of expired RRs can be retained for some domains even after they have been superseded. The copies can be used to detect usage patterns and changes to the domains. As described below, heuristics and other analysis techniques can be applied to the usage patterns and changes to potentially detect compromised RRs for that domain. When a compromised RR is detected, the expired RR data can be revalidated using TLS or another service as discussed above. When the revalidation succeeds, the clients can be steered to valid (e.g., the revalidated) servers until the suspected compromised upstream name server RR has been corrected.

Example Architectures for Managing Name Server Data

FIG. 1 is a block diagram of an example client-server architecture 100 including an intermediary server computer 110 including name server (e.g., DNS) packet processing logic 112. Specifically, FIG. 1 illustrates how network traffic between a client device 140 and an application server computer 120 and/or a server computer 150 can be forwarded by the intermediary server computer 110 and how name server protocol packets can be processed by the intermediary server computer 110 using the name server packet processing logic 112. The client-server architecture 100 can include the intermediary server computer 110, the application server 120, communication network(s) 130, the client device 140, and the server computer 150. The client-server architecture 100 can be implemented using a client-server architecture as described in more detail with reference to FIG. 7, where the different components (110, 120, 130, 140, 150) of the client-server architecture can be implemented using a computing environment as described in more detail with reference to FIG. 8.

The client device 140 and the application server 120 can communicate via the communication network(s) 130 and the intermediary server computer 110. Specifically, requests from the client device 140 can be forwarded through the intermediary server computer 110 to the application server 120 using the communication network(s) 130. The client device 140 can be connected to the intermediary server computer 110 using a public and/or private network, such as the communication network(s) 130. As one example, the intermediary server computer 110 can act as a gateway for the client device 140 to reach public networks, such as the Internet. For example, the intermediary server computer 110 can be managed by an Internet service provider or other provider that connects clients (e.g., the client device 140) to public networks. The client device 140 can send requests to the application server 120 using addresses provided by the DNS server 152 executing on the server computer 150. As described in more detail below, the client device 140 can send requests (e.g., DNS request 160) to the DNS server 152 via the intermediary server computer 110, and DNS responses (e.g., DNS response 171) can be returned to the client device 140 from the intermediary server computer 110.

The client device 140 can be a computing device capable of sending network traffic over a communications network (e.g., network 130). For example, the client device 140 can be a mobile computing device, a desktop computing device, a laptop computing device, a tablet computing device, a virtual machine executing on a cloud-based computing environment, and so forth. The client device 140 can execute an agent (e.g., a browser or other software application) that requests a service provided by the application server 120. The agent can make sub-requests to other services (such as requests to the DNS server 152) that may be transparent to a user of the client device 140. For example, the agent can generate requests that are transmitted by the client device 140 using a connectionless communication protocol (e.g., user datagram protocol (UDP)) or a connection-oriented communication protocol (e.g., transmission control protocol (TCP)).

Each of the server computers of the application server 120 and the server 150 can be computing devices capable of sending network traffic over a communications network (e.g., network 130) and processing requests by client devices (such as the client device 140). The server computers 120 and 150 can include multiple hardware and/or software server resources (not shown), a virtual machine executing on a cloud-based computing environment, and so forth. The server computer 150 can execute a DNS server software application 152 which can respond to DNS client requests and retrieve information from a DNS database (not shown). For example, the DNS data can include a mapping of a service executing on the application server computer 120 to a network address of the application server computer 120. The application server computer 120 can execute a server software application, such as an HTTP server application or a secure shell (SSH) server application, for example. Additionally, the application server computer 120 can execute a non-DNS agent 154. For example, the non-DNS agent 154 can be a TLS or SMTP server software application. The application server computer 120 can include a digital certificate 156 (also referred to as a public-key certificate). The digital certificate 156 can be used by the non-DNS agent 154 to verify that the non-DNS agent 154 is the source of communications from the agent 154. For example, a receiver (e.g., the intermediary 110 or the client 140) of the communications can authenticate the digital certificate 156 using cryptographic techniques. Authentication is the process of verifying that an identity of an entity is genuine.

Generally, cryptography is the study of secure communications. Encryption is the reversible transformation of clear or unencrypted information (e.g., text, plaintext, or data) into data that is computationally infeasible to understand except for the sender or the intended recipient of the information. Decryption is the reversal of the encryption process, where encrypted information is transformed into unencrypted information. Encryption and decryption are performed using one or more cryptographic algorithms that can include one or more cryptographic operations. Cryptographic operations can include encoding information using a cryptographic key, decoding information using a cryptographic key, and generating a cryptographic key. Cryptographic keys are values (e.g., 128- or 256-bit numbers) that are selected based on their cryptographic properties. Cryptographic keys can be symmetric keys or asymmetric keys. When a symmetric key is used to encrypt information, the same symmetric key can be used to decrypt the information. Asymmetric keys come in groups (e.g., a public/private key pair). The group can include a private key and one or more public keys. Information that is encrypted with the private key can be decrypted with the corresponding public key(s). Information that is encrypted with one of the public key(s) can be decrypted with the corresponding private key. In order to keep encrypted information confidential, symmetric keys and private keys are safeguarded using various techniques. Encryption of communications can be used to increase security of a client-server architecture.

The digital certificate 156 can include a public key and a user identifier of the key owner (e.g., the non-DNS agent 154). The public key and the user identifier can be digitally signed by a trusted third party, such as a certificate authority. The certificate authority can use a different public/private key pair. A digital signature is a cryptographic transformation of a data payload (e.g., the public key and the user identifier) that is used to verify a source of origin and data integrity of the data payload. As one example, the data payload can be transformed using a hash function to generate a hash code, and the hash code can be encrypted using a cryptographic key to create the digital signature for the data payload. Specifically, the private key of the certificate authority can be used to encrypt the hash code to create the digital signature. As one example, an agent receiving the digital certificate 156 can authenticate the digital certificate 156 by using the public key of the certificate authority to decrypt the signature and obtain the hash code, which can be compared to an independently generated hash code of the data payload of the digital certificate 156. The digital certificate 156 is authentic when the decrypted hash code matches the independently generated hash code. As an example of a technique to prove that the digital certificate 156 is presented by its owner (e.g., the non-DNS agent 154) and not some other entity, the owner can use the private key corresponding to the public key in the certificate 156, which is kept private by the owner, to create a digital signature of some additional data specified at least in part by the agent and the agent can verify the digital signature using the public key in the certificate.

The traffic management logic 114 of the intermediary server computer 110 can perform various proxy and other services, such as load balancing, rate monitoring, caching, denial of service protection, encryption/decryption, session management (including key generation), address translation, and/or access control, for example. For example, the intermediary server computer 110 can act as a proxy for the application server 120. A proxy is an agent that is situated in a path of communication between a client (e.g., the client device 140) and a server (e.g., the application server 120 and the DNS server 150) that can intercept communications (e.g., network packets, frames, datagrams, and messages) between the client and the server. The intermediary server computer 110 can function as a virtual server that presents a network address of the proxy as the network address for the server 120 and/or for one or more clients 140.

The traffic management logic 114 can offload name server packet processing operations by sending DNS and other name server packets to the name server packet processing logic 112. The name server packet processing logic 112 can include computer hardware, software, or a combination thereof. As one example, the name server packet processing logic 112 can include a hardware co-processor that is tuned for performing operations of DNS and other name server packet processing as disclosed herein. For example, the co-processor can include computer hardware circuitry that is configured to parse DNS packets, cache DNS records, perform timer operations, assemble DNS packets, and so forth. The computer hardware can include circuitry that is fabricated for a single purpose and/or configurable circuitry that is programmable, such as a field-programmable gate array (FPGA). As one example, the name server packet processing logic 112 can include a multi-threaded real-time software routine that interfaces to the traffic management logic 114. For example, the name server packet processing logic 112 can include a software daemon executed by a processor of the intermediary server computer 110. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task. Each thread of the name server packet processing logic 112 can communicate with the traffic management logic 114 using a different session.

The name server packet processing logic 112 can process DNS requests (such as from the client 140) and determine how to service the request. For example, a DNS request can be serviced using locally cached data (such as from a name server data storage 116) and/or data that is obtained from another DNS server (such as to the DNS server 152) in a hierarchy of DNS servers. The name server packet processing logic 112 can process DNS responses (such as from the DNS server 152) and can cache the records of the DNS responses in the name server data storage 116. The name server packet processing logic 112 can manage timing information associated with the DNS records to determine whether the cached data records are expired or unexpired. Valid, unexpired cached data can be used when a DNS request from a client queries for the data. When a DNS request from a client queries for data that is expired or not present in the name server data storage 116, the name server packet processing logic 112 can issue a request (such as to the DNS server 152) for the data. If the request returns the requested data, the data can be stored in the name server data storage 116 and the data can be used to respond to the client. If the request fails, such as when a response does not return or a response returns with an error code, the name server packet processing logic 112 can use another service (such as the non-DNS agent 154) to validate whether the server computer executing the DNS server is still operational. Expired cached information in the name server packet processing logic 112 can be used to service the client DNS request when the other service is used to validate that the computer executing the DNS server is still operational.

As a specific example, the client 140 can send a DNS request 160 to the intermediary server computer 110. For example, the DNS request 160 can request a network address for the non-DNS agent 154. The name server packet processing logic 112 can determine whether the information requested in the DNS request 160 is cached in the name server data storage 116. In this example, the information requested in the DNS request 160 is cached and expired. Because the information is expired, the name server packet processing logic 112 can send a DNS request 161 for the requested information to the server computer 150. In this example, a DNS response is not sent from the server computer 150. For example, the DNS service could be temporarily down and/or under attack. For example, an attacker 180 can be flooding the server computer 150 with DNS packets 190 in a denial of service attack. When a response to the DNS request 161 is not received at the intermediary server computer 110 within a time-out period, it is determined that the DNS server 152 is unavailable. However, the expired cached data in the name server data storage 116 can potentially be validated using the non-DNS agent 154. Specifically, the name server packet processing logic 112 can send a non-DNS request 162 to the non-DNS agent 154. The non-DNS response 170 can include the digital certificate 156. The intermediary server computer 110 can receive the non-DNS response 170 and can authenticate the digital certificate 156 using cryptographic techniques. When the non-DNS response 170 is validated as authentic, the expired cached data from the DNS server 152 can be used to service the DNS request 160. Specifically, the expired cached data from the DNS server 152 can be returned to the client 140 in a DNS response 171.

Figure 2:
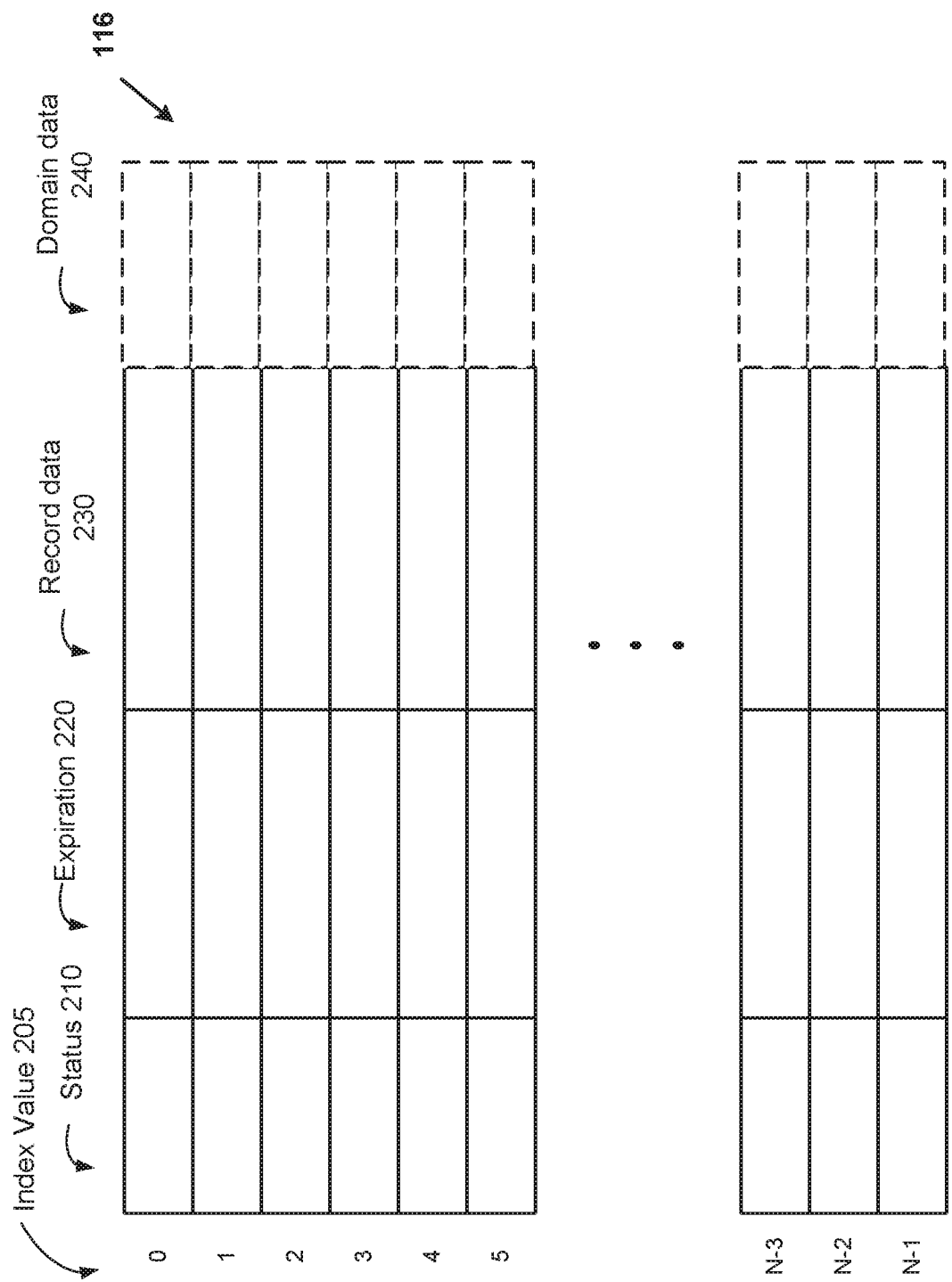
FIG. 2 is a block diagram of an example data structure for storing name server data.

FIG. 2 is a block diagram of an example name server data storage 116 that can be used by the name server packet processing logic 112. The name server data storage 116 can be organized according to a variety of different data structures. A data structure is an organization for data that is stored in a computer-readable memory and that can be accessed by computer logic (e.g., software, hardware, and/or combinations thereof) during execution of the computer logic. As one example, the name server data storage 116 can be organized as table including a two-dimensional array, where a row of the table is referred to as an entry and the different columns of the table can be referred to as fields of the entry. The entries can be identified using the index values 205 which are labeled 0-(N-1) to represent the N entries that can be stored in the table. As one example, the index values can be used to search for the records. For example, the index value selected to store a given record can be determined using specified bits of record data (e.g., bits corresponding to a type and name of the record data) or a hash of all or a portion of the record data. As another example, the name server data storage 116 can include an associative memory (also referred to as a content addressable memory) and the desired record can be located by using a complete or partial field of the record data as a search input of the name server data storage 116.

As one example, an entry can include a status field 210, an expiration field 220, record data 230, and optional domain data 240. The status field 210 can include a value that is representative of the status of the entry. For example, the status can be valid, invalid, stale, or suspicious. An invalid entry contains no record data, such as when the name server data storage 116 is initialized. A valid entry can contain a cached and unexpired record from a DNS server, where the record is assumed to be legitimate. A suspicious entry can contain a cached and unexpired record, where the record is suspected of not being legitimate. For example, the optional domain data 240 can be used to classify name server records as legitimate or suspicious. A stale entry can contain a cached and expired record from a DNS server. A valid entry can indicate that the record data 230 is reliable, whereas invalid, stale, and suspicious entries indicate that the record data 230 may not be reliable.

The expiration field 220 can include a value that can be used to determine whether the record data 230 has expired. For example, a real-time clock can keep track of the passing of time. DNS responses can include a TTL field which indicates a number of seconds before the response expires. As one example, the expiration field 220 can include a sum of the TTL field and the real-time clock value when the response arrives. When the entry is retrieved and the real-time clock is less than the value of the expiration field 220, the entry is unexpired. When the entry is retrieved and the real-time clock is less than the value of the expiration field 220, the entry has expired (and the status 210 can be updated).

The record data 230 can include a complete and/or partial record from a name server. For example, the record data 230 can include a complete and/or partial DNS resource record that has been returned in a DNS response from a DNS server. A DNS resource record includes data that is organized according to one or more predefined types of data structures that are used to store information at a DNS server. Each DNS record can have a type, an expiration time (e.g., a TTL), and type-specific data. As one example, an "A" record type can include a mapping of a 32-bit network address (such as an Internet Protocol version 4 (IPv4) address) to a host name. As another example, an "AAAA" record type can include a mapping of a 128-bit network address (such as an Internet Protocol version 6 (IPv6) address) to a host name. As another example, an "MX" record type can include a mapping of a domain name to a list of message transfer agents (also referred to as a mail server or mail relay) for that domain. As another example, an "NS" record type can include a delegation of a DNS zone to use a given group of authoritative name servers.

The optional domain data 240 can include information that can be used to identify whether a name server record is suspicious. For example, the name server record can be suspicious when an attacker corrupts the record or hijacks the name server. The domain data 240 can include a name (e.g., a domain name), network address, port number, or other information used to identify a server or service associated with the record. As one example, the domain data 240 can include historical information (e.g., earlier versions of record data) about the network address(es) or geographical location(s) of the servers for the domain, timing information related to when a server changes network addresses, and/or other information that can be used to distinguish between legitimate and illegitimate servers. As one example, the domain data 240 can include all possible addresses for the domain's servers, where the addresses are known to be selected from a predefined set of addresses. A response packet can be categorized as suspicious when the response includes a record using an address that is not from the predefined set of addresses. As another example, the domain data 240 can include anticipated geographic locations for the domain's servers. The geographic location for a server can be determined using geolocation techniques, for example. A response packet can be categorized as suspicious when the response includes a record using an address for a geographic location that does not match one of the anticipated geographic locations. As a specific example, DNS hijacking can be suspected when the DNS record includes an Asian address for a service having an American domain name.

It should be appreciated by one of ordinary skill in the art having the benefit of the present disclosure, that while the data storage 116 is illustrated as being organized as a two-dimensional array with four columns and N rows, different organizations are possible.

Figure 3:
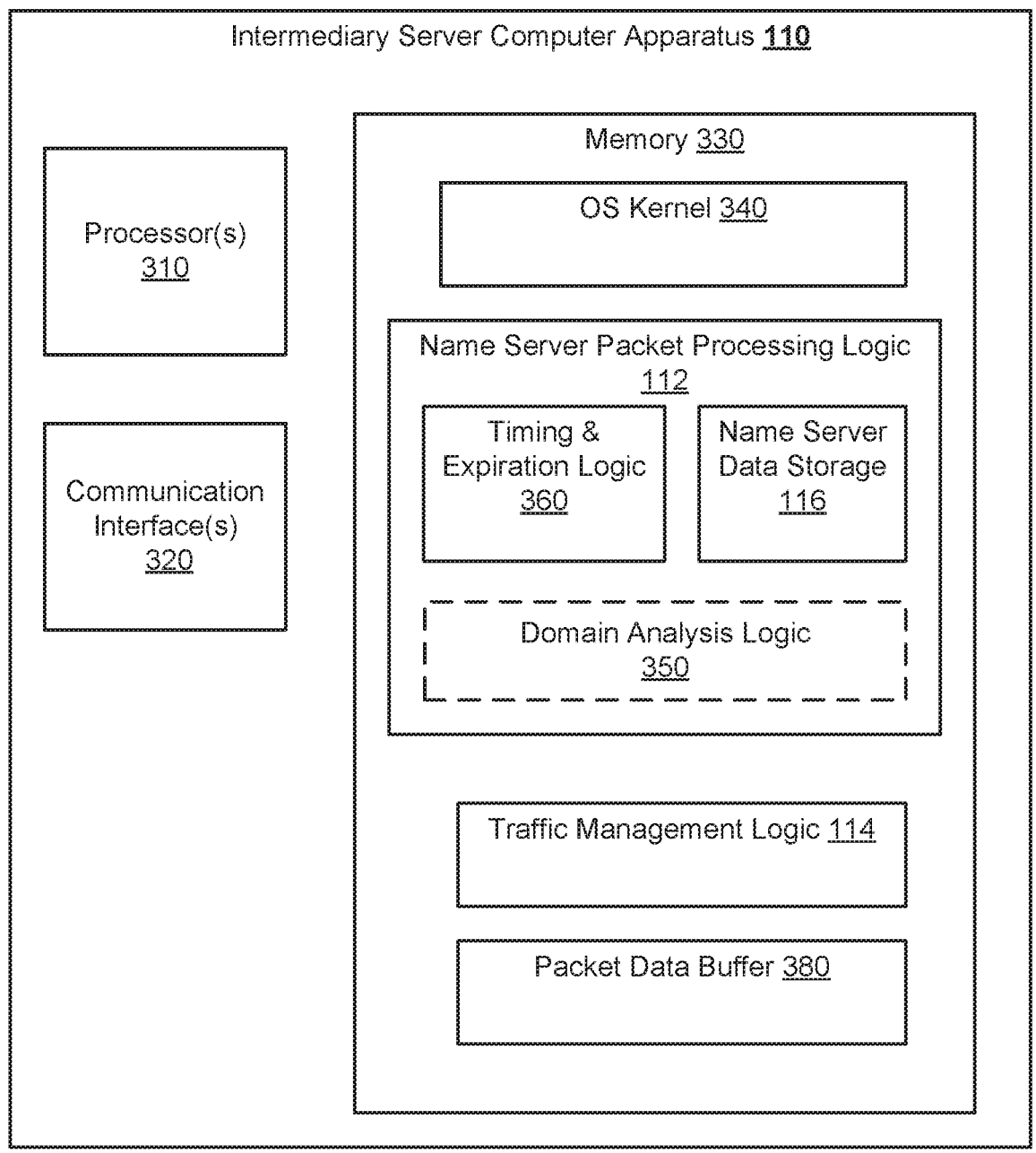
FIG. 3 is a block diagram of an example network traffic management apparatus for managing name server data.

FIG. 3 is a block diagram of an example intermediary server computer apparatus 110 including name server packet processing logic 112. For example, the intermediary server computer apparatus 110 can be a load balancer, an application delivery controller, a network traffic management system, or another component configured to be in a communication path between a client (e.g., client 140 of FIG. 1) and an application server (e.g., application server 120 of FIG. 1) of a client-server architecture. The intermediary server computer apparatus 110 can be implemented using a computing environment as described in more detail with reference to FIG. 8.

The intermediary server computer apparatus 110 can include one or more processor(s) 310, one or more communication interface(s) 320, and memory 330. The processor 310, communication interface 320, and the memory 330 can be coupled together with an interconnect (not shown) so that the components of the computer apparatus 110 can communicate with each other using the interconnect. The communication interface 320 can be used to send and receive communications (e.g., network packets) with other computing devices, such as a client, an application server, and a DNS server. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data (e.g., the name server data storage 116) that is used by the software routines to perform the computing tasks.

The operating system (OS) kernel 340 can include different software routines for managing different aspects of the execution of programs and for interfacing with the hardware of the intermediary server computer apparatus 110. For example, the OS kernel 340 can manage the loading and removal of software applications and other routines into the memory 330 of the computer apparatus 110; the OS kernel 340 can manage storage resources of the computer apparatus 110; the OS kernel 340 can manage processes and/or threads executing on the processor 310; the OS kernel 340 can manage power states of the computer apparatus 110; the OS kernel 340 can provide an interface for applications and other routines to send and receive communications (e.g., network packets) using the communications interface 320; and the OS kernel 340 can enable inter-process communication between different routines executing on the computer apparatus 110.

The traffic management logic 114 can include different software routines for controlling the network traffic transiting the intermediary server computer 110 by performing various proxy and other services, such as load balancing, rate monitoring, caching, encryption/decryption, TLS session management (including key generation), address translation, traffic forwarding, traffic buffering, and/or access control, for example. For example, the traffic management logic 114 can buffer network traffic (such as in the packet data buffer 380) that is to be processed before the traffic is sent over a private or public network to a client or server. As another example, the traffic management logic 114 can buffer outstanding requests that are awaiting a reply from an application server or a DNS server. The traffic management logic 114 can identify DNS network traffic and can request that the name server packet processing logic 112 analyze and process the DNS packets.

The name server packet processing logic 112 can be organized in various different ways. As illustrated, the name server packet processing logic 112 can include timing and expiration logic 360, name server data storage 116, and domain analysis logic 350. The name server data storage 116 can be used to store response data from name server protocols, such as from DNS responses. The timing and expiration logic 360 can be used determine whether the data stored in the name server data storage 116 is expired. For example, the timing and expiration logic 360 can include a real-time clock for measuring the timing of events and the elapsed time between different events. Specifically, the time when a name server response returns and an expiration field (e.g., a TTL field) can be used to determine if data from the response is expired. As described herein, the domain analysis logic 350 can be used to determine whether the data in a name server response is suspicious and/or trustworthy. The different components (116, 350, 360) of the name server packet processing logic 112 can be implemented in computer hardware, software, and combinations thereof.

Generally, the name server packet processing logic 112 can perform the operations of a local name server (e.g., a DNS resolver) with augmented functionality. The name server packet processing logic 112 can receive name service requests from a client (e.g., the client device 140 from FIG. 1) and can generate a response to the client using data stored in the name server data storage 116 and/or data received from remote name server(s) (e.g., the DNS server 152 from FIG. 1). The name server packet processing logic 112 can determine whether reliable data matching the requested data is stored in the name server packet processing logic 112. The name server packet processing logic 112 can issue request(s) to remote name servers to obtain the requested data that is not stored in the name server packet processing logic 112. When the requested data cannot be obtained from a remote name server, a response to the client can potentially be synthesized using unreliable (e.g., stale) data from the name server data storage 116. Specifically, when a second service can be used to validate the unreliable data, the validated data can be used in a synthesized response to the client.

Figure 4:
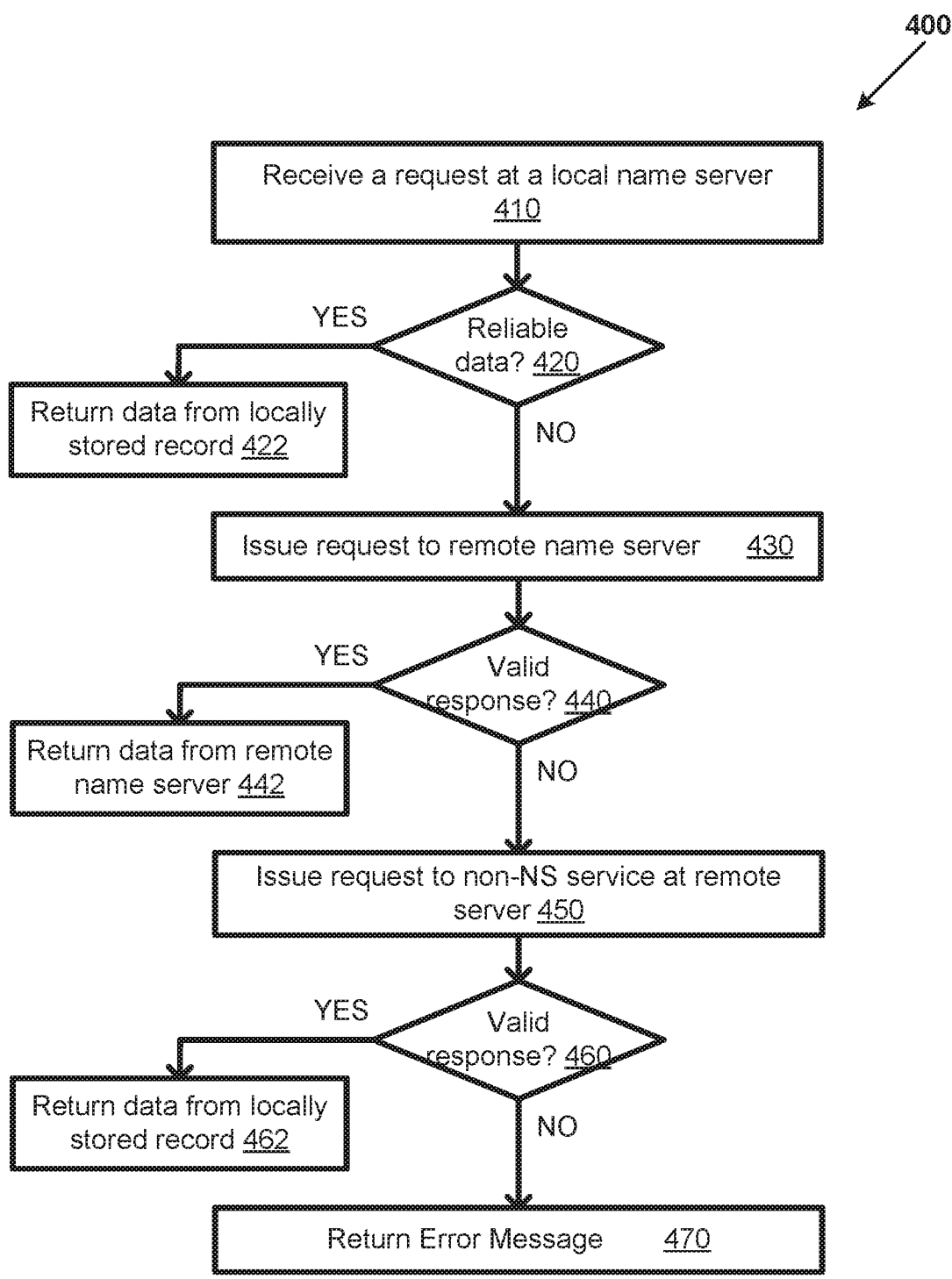
FIG. 4 is a flowchart of an example method for managing name server data.

As one example, the name server packet processing logic 112 can implement a method 400 for managing name server data, as illustrated in FIG. 4. For example, the name server packet processing logic 112 can include computer-executable instructions and the instructions can be executed by the processor 310 to perform the method 400.

At 410, a request can be received at a local name server (e.g., the name server packet processing logic 112). For example, the request can be DNS request. The DNS request can be requesting a DNS record that is identified by a type and a name. The type and the name of the record can be used so search the name server data storage 116 to determine whether the requested record is stored in the name server data storage 116.

At 420, it can be determined whether reliable data matching the requested record is stored in a local data store, such as the name server data storage 116. Initially, it can be determined whether any data matching the requested record is stored in the name server data storage 116. If there is matching data (a hit in the name server data storage 116), the status of the data can be analyzed to determine whether the data is reliable. For example, unexpired data that does not appear suspicious can be classified as reliable data. When reliable data matching the requested record is present in the name server data storage 116, the stored reliable data can be used in a DNS response that is returned to the client at 422. As another example, expired data and/or suspicious data can be classified as unreliable. When there is no locally stored reliable data (e.g., there is unreliable data or the requested record misses in the name server data storage 116) matching the requested record, the method 400 can continue at 430.

At 430, a request can be issued to a remote name server. For example, the name server packet processing logic 112 can issue a DNS request to a remote DNS server (e.g., the DNS server 152 of FIG. 1) for the requested record. A timer can be started when the DNS request is sent to indicate a maximum time period to wait for the response from the remote DNS server. Data from the response (if a response is received) returning from the remote DNS server can be cached in the name server data storage 116 and can potentially be used to form a DNS response to the DNS client.

At 440, it can be determined whether valid data matching the requested record has been received in a response from the remote name server. As one example, the response may be valid only when it is received within a given amount of time after the request was sent. For example, the amount of time specified to receive a valid response can be 100 milliseconds (ms), 200 ms, or another suitable value. As another example, a response can be evaluated to determine whether the response is suspicious. For example, if the response includes a record with a network address that does not match a set of known addresses for the domain or if the network address is associated with an unexpected geographic location, the response can be suspicious. When valid data matching the requested record has been received, the valid data can be used in a DNS response that is returned to the client at 442. However, when unreliable data matching the requested data is stored in the name server data storage 116 and no valid data was received from the remote name server (e.g., no response was returned or the response returned after a time-out period), a DNS response can potentially be synthesized using unreliable data (e.g., expired or suspicious data) that is stored in the name server data storage 116. Specifically, the unreliable data can be used when the unreliable data can be validated using a non-name-server service. When unreliable data matching the requested data is stored in the name server data storage 116 and no valid data was received from the remote name server, the method 400 can continue at 450.

At 450, a request can be issued to a non-name-server service at a remote server. The request can be used to validate the unreliable data stored in the name server data storage 116. As one example, validation can be performed by connecting to the named service at an address indicated by the unreliable record data (for example, the record can be a DNS record of a type A, AAAA, MX, OPT, or another type) and authenticating that service cryptographically or by another means (when another means is sufficiently reliable).

At 460, it can be determined whether a valid response is returned from the remote server. For example, validation can be successful when proof is obtained from the remote server at the putative address that it represents the named (requested) service. The proof can be based on cryptographic techniques and/or based on a format of the response. One form of authentication is by a public key infrastructure (PKI) which is facilitated by a TLS handshake. For example, the request to the remote server can request to connect to TCP port 443 or to another TLS port at the putative address, placing the target name in TLS SNI, then check whether the remote server's digital certificate matches the target name and is trustworthy. A protocol such as STARTTLS may be used when appropriate. The general scheme of asking a remote server at a putative address to provide some proof that it represents that named service can be applied with other authentication schemes. For example, the request to the remote server can request to connect to SSH port 22 at the putative address and an SSH server certificate in the response can be used to validate the unreliable data. Additionally, non-cryptographically-secured proof (such as a stylized server response to a query containing a reference, such as an HTTP Host header, to the desired service) can be acceptable for validation under some conditions. When more than one putative address is available within the unreliable data any or all of the addresses may be tested to find one or more which are valid.

When validation succeeds, the unreliable data can be assumed to be validated. The status of the unreliable data stored in the name server data storage 116 can be changed to unsuspicious, unexpired, or tentative, for example. As a specific example, the expiration field of the data can be extended for a few seconds or a few minutes beyond when the response was validated. When validation succeeds, the validated data stored in the name server data storage 116 can be returned to the client at 462 in a response packet.

When validation fails, an error message can be returned to the client at 470, indicating that the name server data could not be retrieved.

Example Methods of Managing Name Server Data

Figure 5:
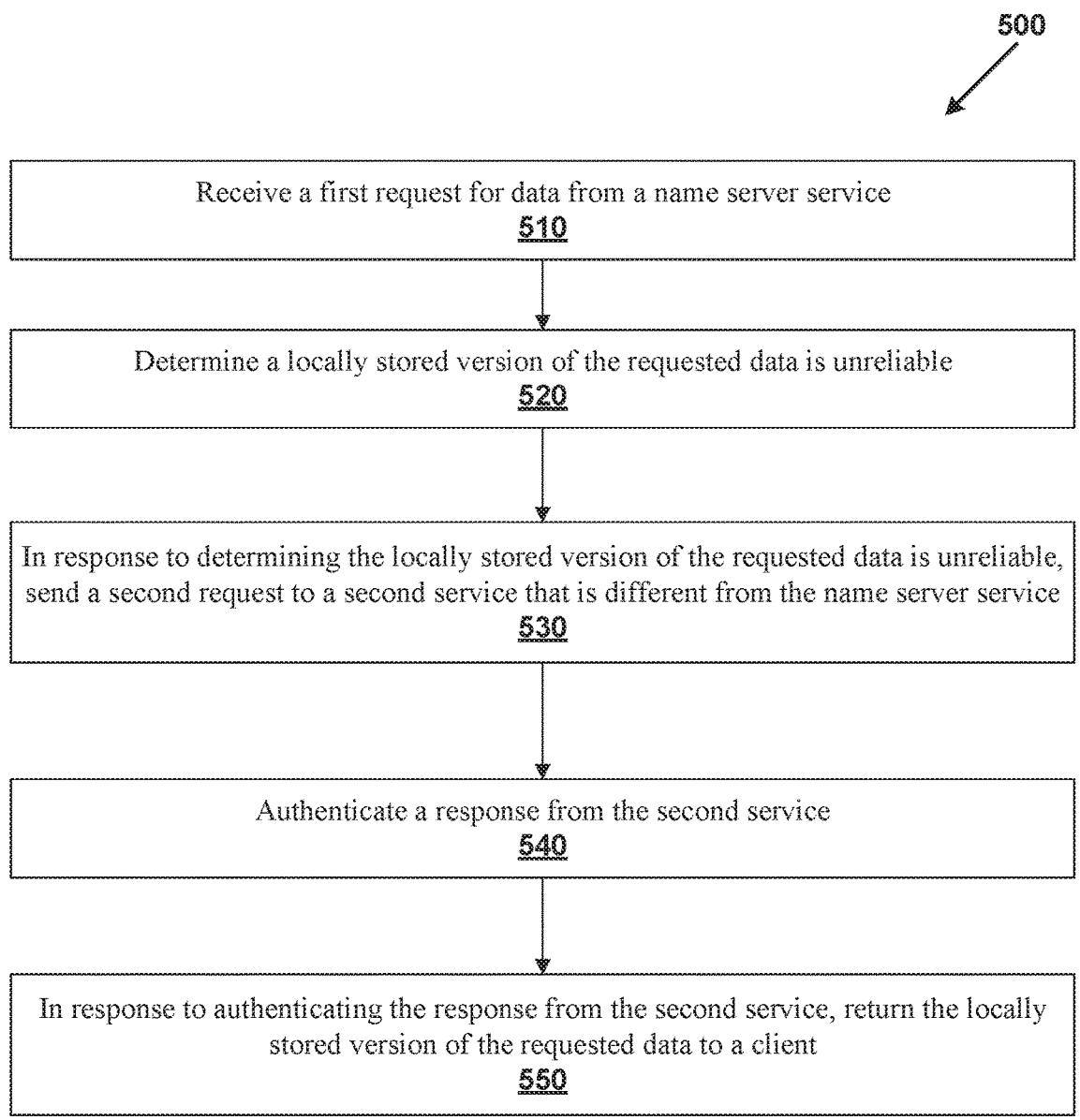
FIG. 5 is a flowchart of an example method for managing name server data.

FIG. 5 is a flowchart of an example method 500 for managing name server data. Specifically, the method 500 illustrates how locally stored unreliable name server data can be validated using a non-name-server service, so that the validated name server data can be used in a response to a client. The method 500 can be implemented using the architecture 100, such as described above in reference to FIGS. 1-4. As one example, computer-executable instructions for carrying out the method 500 can be stored in computer-readable memory (e.g., the memory 330) and the instructions can be executed by one or more processor(s) (e.g., the processor 310) to perform the method 500.

At 510, a first request for data from a name server service can be received. For example, the name server service can be DNS, and the first request for data can be a DNS request from a client for a resource record. The DNS request can identify the requested resource record by a type of the record and a name of the record. A class code can also be used to identify the requested resource record. Multiple records can be requested in the same request. As one example, the name server request can be sent from a DNS client (e.g., the client 140), addressed to a DNS server (e.g., the DNS server 152), and intercepted by the intermediary server computer 110.

At 520, a locally stored version of the requested data can be determined to be unreliable. For example, the locally stored version of the requested data can be stored in a volatile or non-volatile memory (e.g., the name server data storage 160) of the intermediary server computer 110. The local memory can be searched to determine whether the requested data is present in the local memory and a status of the requested data can be determined. The status can indicate the requested data is valid, expired, or suspicious, for example. The name server service can attempt to update the locally stored data from a remote server when the status of the data is expired or suspicious. When the remote server is non-responsive (such as when the name server service is down), the expired and/or suspicious data can be unreliable. Specifically, the locally stored version of the requested data can be unreliable because a time period associated with the locally stored version of the requested data has expired (e.g., the status indicates the requested data is expired) and the data has not been refreshed. For example, the requested data can be a resource record including a TTL field, where the TTL field indicates the time period in seconds for the record to be valid after the record is received. As another example, the requested data can be suspicious. For example, the locally stored version of the requested data may include a network address that violates or matches a rule associated with the requested data. For example, a rule can specify that a United States network domain (e.g., .com, .org, .gov, and so forth) is suspicious when the network address associated with the domain has an associated geographic location that is outside of the United States. For example, a geolocation service can match a network address to a likely geographic location. As another example, a timing of updates of the requested data can be tracked, and a rule can indicate that data is suspicious when the data is updated sooner than typically observed or at an atypical time of day. As another example, network addresses of the data can be monitored during updates of the data, and a rule can indicate that data is suspicious when the network address is changed to a value that has not been observed in a prior update.

At 530, in response to determining the locally stored version of the requested data is unreliable, a second request can be sent to a second service different from the name server service. Before the second request is sent to the second service, a request to the name server service, executing on a remote server, can be sent in an attempt to update the unreliable data with fresh data. If fresh data from the name server service is not received within a time-out period, the second service can be used to validate the unreliable data. In other words, the second request can be sent to the second service in response to determining the locally stored version of the requested data is unreliable and failing to receive a response from the name server service within a time-out period. For example, the second service can be specified in the first request and a putative network address of the second service can be included in the unreliable data. Specifically, the first request can be requesting an A-type record for the service "www.example.com," which is specified in a name field of the requested record. An IP address (e.g., 1.2.3.4) for "www.example.com" can be included in an expired record that matches the requested record. A request to "www.example.com" can be sent to the IP address 1.2.3.4 to illicit a response from the "www.example.com" service. For example, a TLS handshake can be initiated to cause the server computer at the IP address 1.2.3.4 to return a digital certificate.

At 540, a response from the second service can be authenticated. For example, the response can include a digital certificate purported to be from the service identified in the first request. Authenticating the response from the second service can include performing one or more cryptographic operations to determine the response was sent from a server for the domain identified within the requested data. For example, the digital certificate can be signed by certificate authority and authenticating the digital certificate can include decrypting a digital signature of the digital certificate using a public key of the certificate authority. To prove ownership of the digital certificate the second service may use its private key to generate a digital signature for some additional data to be validated using the public key encoded in the digital certificate.

At 550, in response to authenticating the response from the second service, the locally stored version of the requested data can be returned to a client. By authenticating the response from the second service, the locally stored unreliable data can be validated as functional. The validated data can be used in a response to the client that is formatted according to a response of the name server protocol. Returning the validated data to the client can harden the name server service against DoS attacks targeted to the name server service by enabling validated data to be returned when some components of the name server service may be unavailable.

Figure 6:
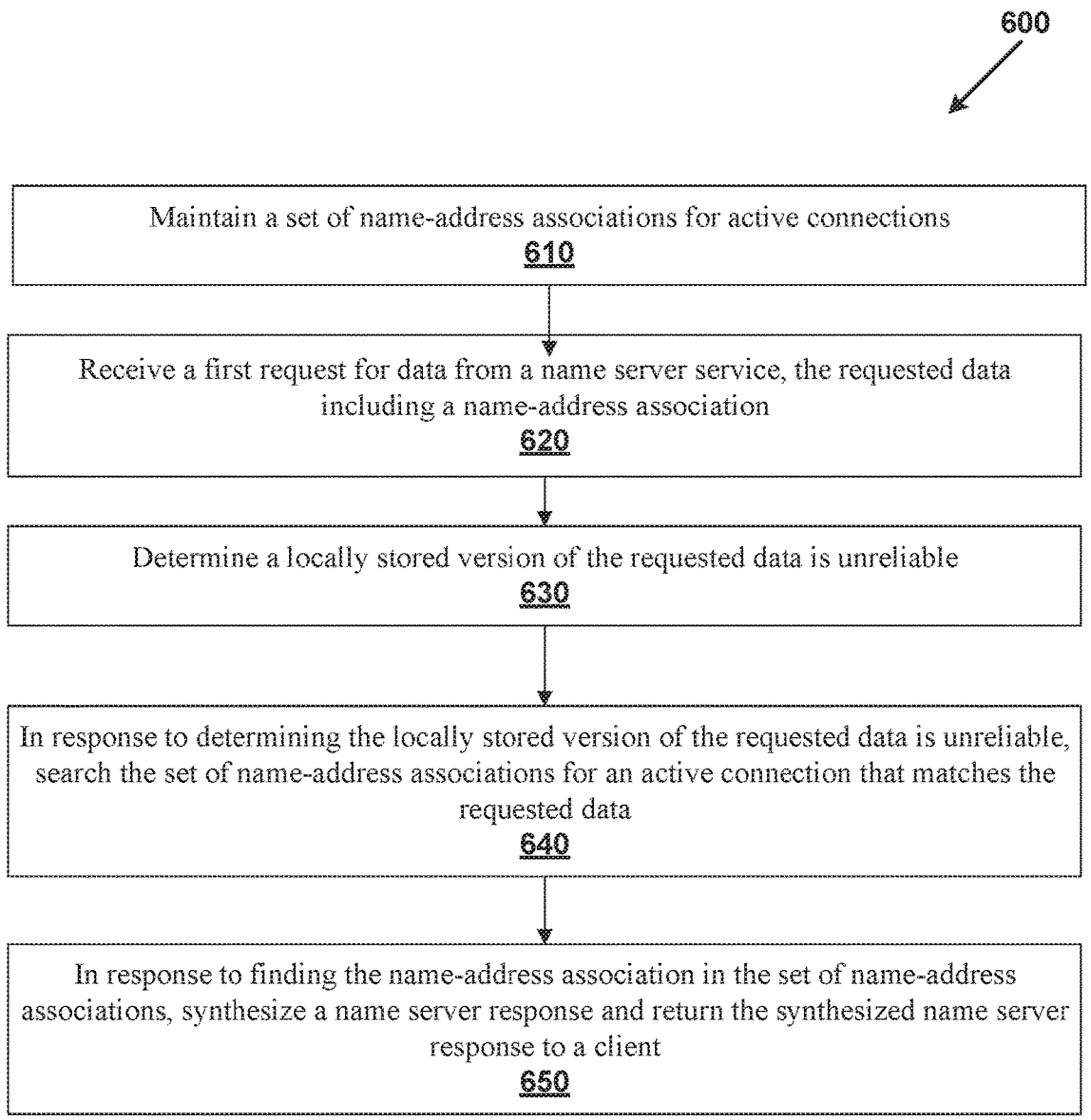
FIG. 6 is a flowchart of an example method for managing name server data.

FIG. 6 is a flowchart of an example method 600 for managing name server data. Generally, the method 600 differs from earlier described methods by using observed network traffic to synthesize a name server (e.g., DNS) response rather than initiating a response from a non-nameserver service. For example, TLS (or other) communication connections can be observed through a service-chain or gateway to learn associations between domain names (from TLS SNI or similar) and network (e.g., IP) addresses. When normal DNS resolution of those domain names is impaired (such as by a DoS attack on upstream nameservers), a nameserver with access to the learnt name-address associations may synthesize DNS responses from those associations, possibly in combination with cached data including nominally expired resource records. For example, {name, address} tuples can be extracted from application traffic and combined with locally stored DNS information to synthesize a DNS response when appropriate. The method 600 can be implemented using the architecture 100, such as described above in reference to FIGS. 1-5. As one example, computer-executable instructions for carrying out the method 600 can be stored in computer-readable memory (e.g., the memory 330) and the instructions can be executed by one or more processor(s) (e.g., the processor 310) to perform the method 600.

The method 600 can be well suited for implementation within a large network infrastructure such as that of an Internet Service Provider (ISP). In such an implementation, the functions of an intermediary server computer can be distributed among a number of hardware and/or software modules. The different modules may coordinate their actions and cooperate among one another. Accordingly, the different modules may be referred to as cooperating gateways (CGWs) and cooperating nameservers (CNSs). These are logical groups of functions and can be executed on a single machine or separate machines. There can be a multiplicity of CGW and CNS entities, plus optionally some cooperating control, database, and reporting functions.

At 610, a set of name-address associations can be maintained for active connections. CGWs see application network traffic and they can be positioned at network relay or choke points between clients and servers. One set of information a CGW can extract from network traffic is a name, a network address, and (perhaps implicitly, as part of message transmission) a time at which a client connects to a named service. A CGW can also collect protocol ports and network routing data. A CGW can also collect client information (e.g., a client address, an identity, a geographic location, and so forth), server information (such as credential data), and information about connections such as duration. For unencrypted connections, data such as HTTP request path and a synopsis of the response can be collected.

A CGW can record the provenance of data elements, such as whether a server name-address has been cryptographically validated. One source of name-address information is the TLS protocol. HTTP is another source, but an implementation may give less weight to information collected from HTTP since HTTP is not cryptographically validated like information from TLS. Generally, any protocol where a name-address tuple can be extracted can be used. A CGW can notify a CNS of name-address tuples even when the CGW is not able to validate them (e.g., when the CGW is unable to trust a TLS server certificate) since a CNS may be able to check the tuples another way, such as by using DANE or a larger root-CA collection, or by correlating reports from various CGWs. Additionally, a CGW can send credential data such as a certificate fingerprint, to a CNS, or a CNS can attempt to independently validate server data from a CGW.

As one example, a CGW can rely on clients to validate server identities, so any TLS conversation which extends past the initial session negotiation likely confirms that the server does host a service named by SNI. As another example, a CGW can parse an observed server certificate (such as during a full TLS handshake) and confirm that DN or SAN matches SNI, though alone that may not provide cryptographic assurance. As another example, a CGW can copy the SNI and perform a TLS handshake with the server to gain cryptographic assurance that the asserted (certificate) identity really belongs to the server. A CGW can also send data to a CNS to let it validate a server's identity. If a CGW sends end-of-connection messages, a CNS can maintain reference counts (for name-address pairs) and/or gather statistical information representative of system activity. Rather than a domain name, a later message can include a hash value or an arbitrary reference number to associate it with an earlier message. When the CGW and CNS are on separate machines, messages between the CGW sends the CNS over a public network can be cryptographically authenticated to protect the integrity of the information. As a CNS receives name-address data from a CGW, the CNS can update various cache and/or map data. For example, the set of name-address associations can be stored in designated fields of the name server data storage 116.

At 620, a first request for data from a name server service can be received. The requested data can include a name-address association, such as a domain name, network address pair. For example, the name server service can be DNS, and the first request for data can be a DNS request for a resource record (such as a type A or AAAA record). The DNS request can identify the requested resource record by a type of the record and a name of the record. A class code can also be used to identify the requested resource record. Multiple records can be requested in the same request. As one example, the name server request can be sent from a DNS client (e.g., the client 140), addressed to a DNS server (e.g., the DNS server 152), and intercepted by the intermediary server computer 110 which performs the CGW and CNS functions.

At 630, a locally stored version of the requested data can be determined to be unreliable. For example, the locally stored version of the requested data can be stored in a volatile or non-volatile memory (e.g., the name server data storage 160) of the intermediary server computer 110. The local memory can be searched to determine whether the requested data is present in the local memory and a status of the requested data can be determined. The status can indicate the requested data is valid, expired, or suspicious, for example. The name server service can attempt to update the locally stored data from a remote server when the status of the data is expired or suspicious. When the remote server is non-responsive (such as when the name server service is down), the expired and/or suspicious data can be unreliable.

As one example, the locally stored version of the requested data can be unreliable because a time period associated with the locally stored version of the requested data has expired (e.g., the status indicates the requested data is expired) and the data has not been refreshed. For example, the requested data can be a resource record including a TTL field, where the TTL field indicates the time period in seconds for the record to be valid after the record is received. However, the locally stored version of the requested data can potentially be validated, without receiving information from the name server service, by using the information from the set of name-address associations for active connections.

As another example, the requested data can be suspicious. For example, the locally stored version of the requested data may include a name-address association that violates or matches a rule associated with the requested data (such as discussed with reference to 520 of FIG. 5). Additionally, a distributed architecture with cooperating CGWs and CNSs can potentially be used to cross-check each other to ensure uniformity of the namespace. For example, the set of name-address associations for active connections can be used as a database to associate domain names and addresses independent of the name server service. If different clients receive different name-address associations for a given domain name, the client may be a victim of a spoofing attack. As a specific example, if a particular client is communicating with www.example.com at address 203.0.113.222 even though the authoritative A record for that domain had been 192.0.2.5 for multiple TTLs, it can be suspected that the client is the victim of a DNS spoofing attack.

At 640, in response to determining the locally stored version of the requested data is unreliable, the set of name-address associations can be searched for an active connection that matches the requested data. For example, the names of the active connections can be searched to determine if there is an active connection to another client for the requested name-address association. As a specific example, if the first request is requesting an A-type record for the "www.example.com" domain, the set of name-address associations can be searched for an active connection from a different client to the "www.example.com" domain.

At 650, in response to finding the name-address association in the set of name-address associations, a name server response can be synthesized and the synthesized name server response can be returned to a client. For example, the information from the set of name-address associations to build the synthesized name server response. As a specific example, if the set of name-address associations includes an entry for www.example.com with the address 203.0.113.222, a DNS A-type record can be constructed that specifies the mapping of www.example.com to the address 203.0.113.222. The synthesized TTL field can be set to a relatively short value (e.g., one half or one tenth the value of the provided by the name server service) so that the mapping can be updated by the name server service when the service is available again.

Example Computing Environments

Figure 7:
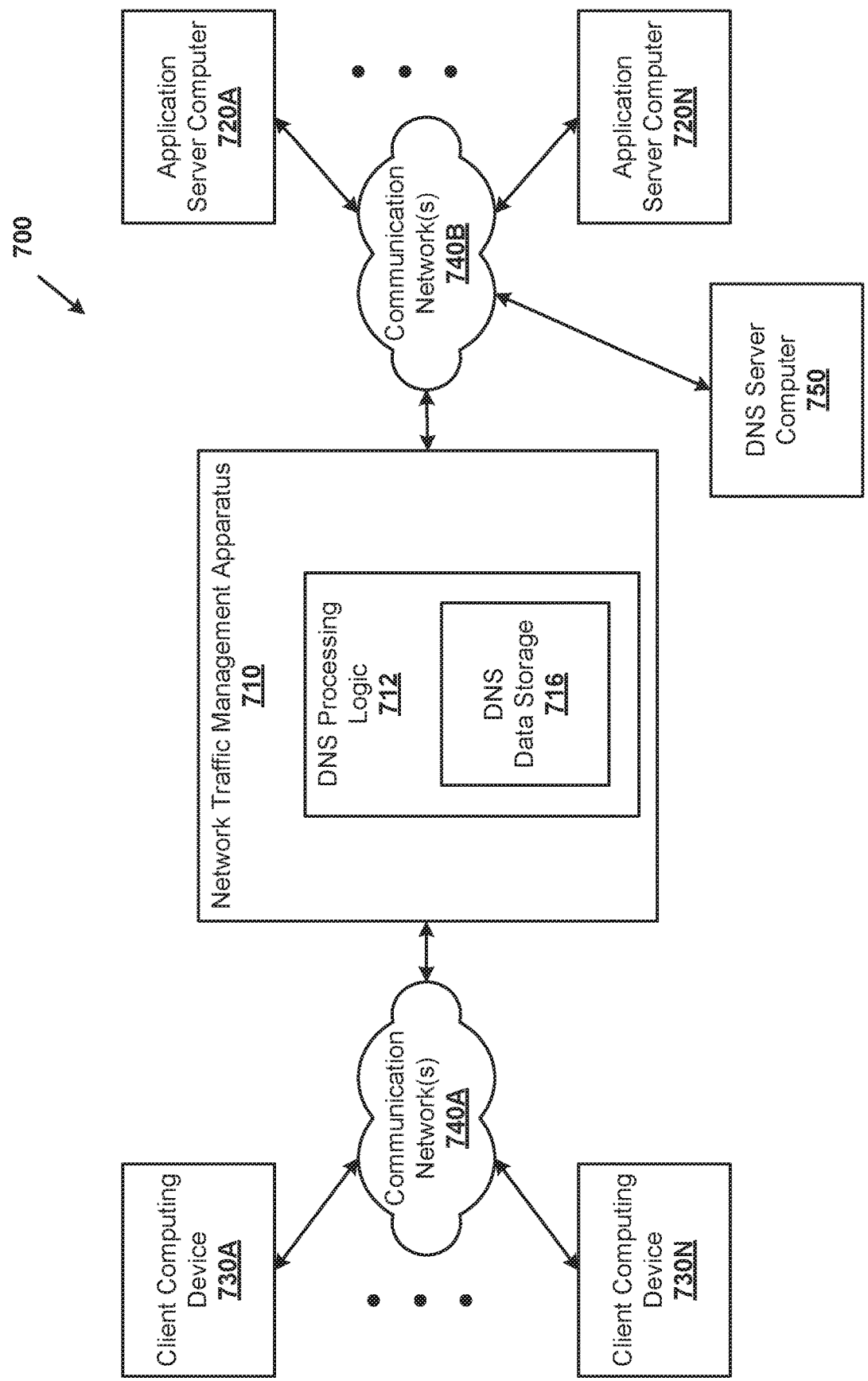
FIG. 7 is a block diagram of an example client-server architecture including logic for managing name server data.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as application server computers 720A-N and DNS server computer 750) and one or more client devices (such as client computing devices 730A-N) via one or more communication networks (such as the communication networks 740A and 740B). The server computers 720A-N and 750 can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N and 750 so that the network traffic management apparatus 710 can intercept all network traffic flowing between the different networks 740A and 740B. In other examples, the network traffic management apparatus 710, the server computers 720A-N and 750, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
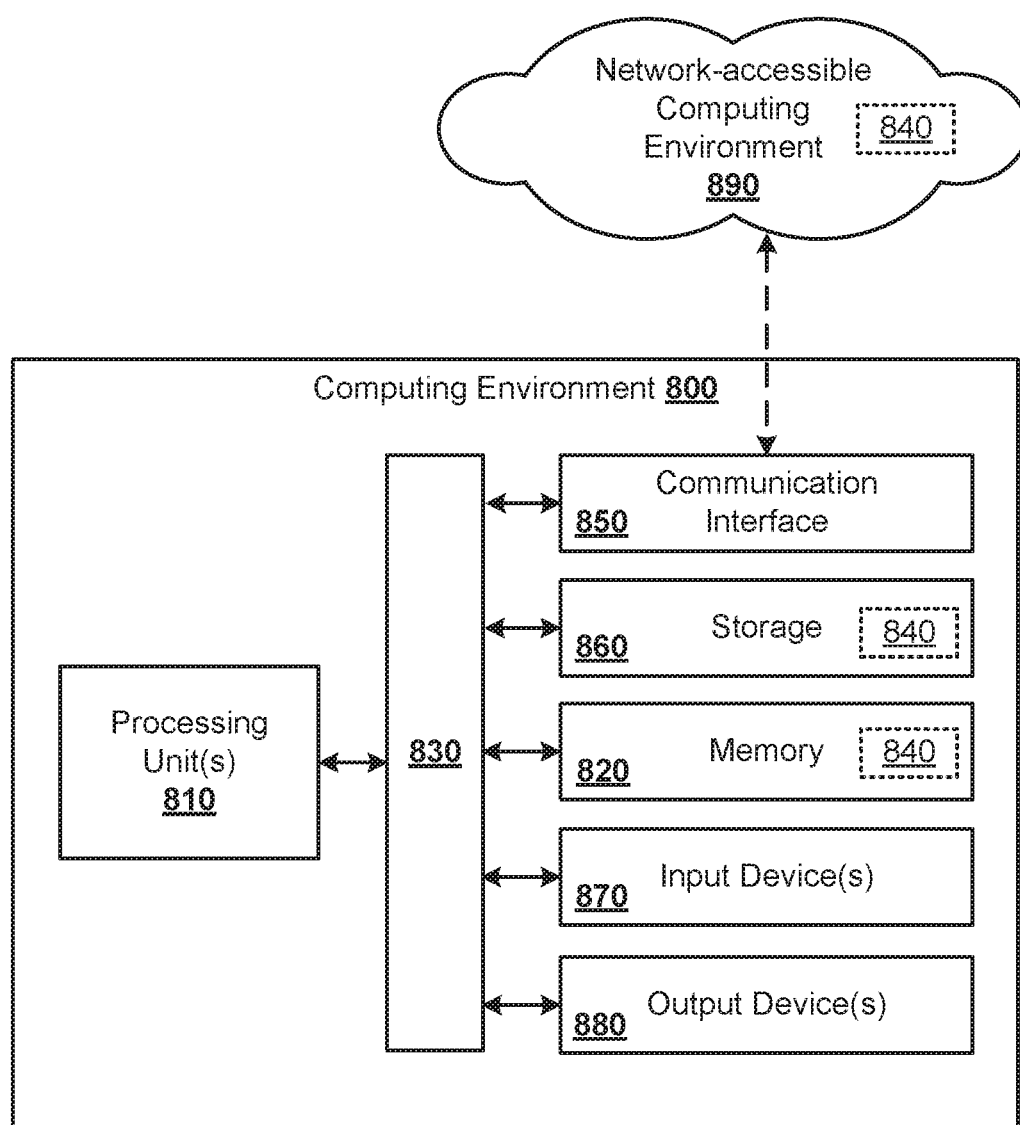
FIG. 8 is a block diagram of an example computing environment, such as can be used for a server computer.

Generally, the server computers 720A-N and 750, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N and 750 via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N and 750 can include any type of computing device that can exchange network data. For example, the server computers 720A-N and 750 can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks. The server computer 750 can execute a DNS server application.

While the server computers 720A-N and 750 are illustrated as single devices, one or more actions of each of the server computers 720A-N and 750 may be distributed across one or more distinct network computing devices that together comprise one or more of the server computers 720A-N and 750. Moreover, the server computers 720A-N and 750 are not limited to a particular configuration. Thus, the server computers 720A-N and 750 may contain network computing devices that operate using a coordinated approach, whereby one of the network computing devices of the server computers 720A-N and 750 operate to manage or otherwise coordinate operations of the other network computing devices. Each of the server computers 720A-N and 750 can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N and 750 can operate within the network traffic management apparatus 710 itself rather than as a stand-alone server device communicating with the network traffic management apparatus 710 via communication network 740B. In this example, the one or more of the server computers 720A-N and 750 operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Each of the functions can be performed by a service. The services can be incorporated into workloads that are executed by the network traffic management apparatus 710 For example, the network traffic management apparatus 710 can include a workload that is used to perform proxy and other services on behalf of the server 720A-N and to manage traffic between the clients 730A-N and the servers 720A-N. Additionally, the network traffic management apparatus 710 can include other network devices such as one or more routers or switches, for example.

The network traffic management apparatus 710 can include packet processing logic 712 and DNS data storage 716 as described above with reference to FIGS. 1-5. For example, the packet processing logic 712 can intercept DNS requests from the client devices 730 and can intercept DNS responses from the DNS server computer 750. The intercepted DNS requests can be serviced using data matching the request that is stored in the DNS data storage 716. When there is no data matching the request stored in the DNS data storage 716 or when the data matching the request stored in the DNS data storage 716 is unreliable, the packet processing logic 712 can send DNS requests for the data to the DNS server computer 750. When the DNS server computer 750 responds with the requested data, the data can be cached in the DNS data storage 716 and returned to the requesting client device 730. When the DNS server computer 750 dose not respond with the requested data, such as when the DNS service is unavailable from the network 740B, unreliable data stored in the DNS data storage 716 can be validated using a service executing on one or more of the application server computers 720A-N. If the unreliable data can be validated, the validated data can be returned to the requesting client device 730 in a synthesized DNS response.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for managing name server data.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for managing name server data) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:
   receiving a first request for data from a name server service;
   determining a locally stored version of the requested data is unreliable;
   in response to determining the locally stored version of the requested data is unreliable, sending a second request to a second service different from the name server service;
   authenticating a response from the second service; and
   in response to authenticating the response from the second service,
   returning the locally stored version of the requested data to a client.

2. The method of claim 1, wherein the first request for data is a Domain Name System (DNS) request.

3. The method of claim 1, wherein the locally stored version of the requested data is unreliable because a time period associated with the locally stored version of the requested data has expired.

4. The method of claim 1, wherein authenticating the response from the second service comprises performing one or more cryptographic operations to determine the response was sent from a domain identified within the requested data.

5. The method of claim 1, wherein the second request is sent to the second service in response to determining the locally stored version of the requested data is unreliable and failing to receive fresh data from the name server service within a time-out period.

6. A system comprising one or more network traffic management modules, networking modules, or server modules, memory comprising programmed instructions stored thereon, and one or more processors configured to be capable of executing the stored programmed instructions to:
   receive a first request for data from a name server service;
   determine a locally stored version of the requested data is unreliable;
   in response to determining the locally stored version of the requested data is unreliable, send a second request to a second service different from the name server service;
   authenticate a response from the second service; and in response to authenticating the response from the second service, return the locally stored version of the requested data to a client.

7. The system of claim 6, wherein the first request for data is a Domain Name System (DNS) request.

8. The system of claim 6, wherein the locally stored version of the requested data is unreliable because a time period associated with the locally stored version of the requested data has expired.

9. The system of claim 6, wherein authenticating the response from the second service comprises performing one or more cryptographic operations to determine the response was sent from a domain identified within the requested data.

10. The system of claim 6, wherein the second request is sent to the second service in response to determining the locally stored version of the requested data is unreliable and failing to receive fresh data from the name server service within a time-out period.

11. A non-transitory computer readable medium having stored thereon instructions comprising executable code that, when executed by one or more processors, causes the processors to:
receive a first request for data from a name server service;
determine a locally stored version of the requested data is unreliable;
in response to determining the locally stored version of the requested data is unreliable, send a second request to a second service different from the name server service;
authenticate a response from the second service; and
in response to authenticating the response from the second service, return the locally stored version of the requested data to a client.

12. The computer readable medium of claim 11, wherein the first request for data is a Domain Name System (DNS) request.

13. The computer readable medium of claim 11, wherein the locally stored version of the requested data is unreliable because a time period associated with the locally stored version of the requested data has expired.

14. The computer readable medium of claim 11, wherein authenticating the response from the second service comprises performing one or more cryptographic operations to determine the response was sent from a domain identified within the requested data.

15. The computer readable medium of claim 11, wherein the second request is sent to the second service in response to determining the locally stored version of the requested data is unreliable and failing to receive fresh data from the name server service within a time-out period.

16. A network traffic management apparatus, comprising memory comprising programmed instructions stored thereon and one or more processors configured to be capable of executing the stored programmed instructions to:
receive a first request for data from a name server service;
determine a locally stored version of the requested data is unreliable;
in response to determining the locally stored version of the requested data is unreliable, send a second request to a second service different from the name server service;
authenticate a response from the second service; and
in response to authenticating the response from the second service, return the locally stored version of the requested data to a client.

17. The network traffic management apparatus of claim 16, wherein the first request for data is a Domain Name System (DNS) request.

18. The network traffic management apparatus of claim 16, wherein the locally stored version of the requested data is unreliable because a time period associated with the locally stored version of the requested data has expired.

19. The network traffic management apparatus of claim 16, wherein authenticating the response from the second service comprises performing one or more cryptographic operations to determine the response was sent from a domain identified within the requested data.

20. The network traffic management apparatus of claim 16, wherein the second request is sent to the second service in response to determining the locally stored version of the requested data is unreliable and failing to receive fresh data from the name server service within a time-out period.

* * * * *